(12) United States Patent
Nardi et al.

(10) Patent No.: US 10,807,165 B2
(45) Date of Patent: Oct. 20, 2020

(54) CONDITIONING ONE OR MORE ADDITIVE MANUFACTURED OBJECTS

(71) Applicant: United Technologies Corporation, Farmington, CT (US)

(72) Inventors: Aaron T. Nardi, East Granby, CT (US); Zissis Dardas, Worcester, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 1024 days.

(21) Appl. No.: 15/111,378

(22) PCT Filed: Jan. 22, 2015

(86) PCT No.: PCT/US2015/012469
§ 371 (c)(1),
(2) Date: Jul. 13, 2016

(87) PCT Pub. No.: WO2015/112723
PCT Pub. Date: Jul. 30, 2015

(65) Prior Publication Data
US 2016/0325358 A1 Nov. 10, 2016

Related U.S. Application Data

(60) Provisional application No. 61/931,335, filed on Jan. 24, 2014.

(51) Int. Cl.
| | |
|---|---|
| *B22F 3/24* | (2006.01) |
| *B22F 3/105* | (2006.01) |
| *B28B 1/00* | (2006.01) |
| *B22F 7/06* | (2006.01) |
| *B22F 7/08* | (2006.01) |
| *B33Y 10/00* | (2015.01) |
| *B33Y 30/00* | (2015.01) |
| *B33Y 40/00* | (2020.01) |
| *B23K 26/12* | (2014.01) |
| *B23K 26/342* | (2014.01) |
| *B23K 26/70* | (2014.01) |
| *B23K 15/00* | (2006.01) |
| *B23K 26/00* | (2014.01) |
| *B23K 26/16* | (2006.01) |
| *C23C 8/02* | (2006.01) |
| *C23C 8/08* | (2006.01) |
| *C23C 8/24* | (2006.01) |

(52) U.S. Cl.
CPC .............. *B22F 3/24* (2013.01); *B22F 3/1055* (2013.01); *B22F 7/06* (2013.01); *B22F 7/08* (2013.01); *B23K 15/0026* (2013.01); *B23K 15/0086* (2013.01); *B23K 15/0093* (2013.01); *B23K 26/0006* (2013.01); *B23K 26/126* (2013.01); *B23K 26/1224* (2015.10); *B23K 26/16* (2013.01); *B23K 26/342* (2015.10); *B23K 26/702* (2015.10); *B28B 1/001* (2013.01); *B33Y 10/00* (2014.12); *B33Y 30/00* (2014.12); *B33Y 40/00* (2014.12); *C23C 8/02* (2013.01); *C23C 8/08* (2013.01); *C23C 8/24* (2013.01); *B22F 2003/1059* (2013.01); *B22F 2003/242* (2013.01); *B22F 2003/248* (2013.01); *B22F 2201/00* (2013.01); *B22F 2201/20* (2013.01); *B22F 2201/40* (2013.01); *B22F 2998/10* (2013.01); *Y02P 10/295* (2015.11)

(58) Field of Classification Search
CPC .. B22F 3/24; B22F 3/1055; B22F 7/06; B22F 7/08; B33Y 10/00; B33Y 33/00; B33Y 40/00; B23K 26/1224; B23K 26/342
USPC .......................................................... 419/29
See application file for complete search history.

(56) References Cited

U.S. PATENT DOCUMENTS

| | | |
|---|---|---|
| 7,789,037 B2 | 9/2010 | Teulet |
| 8,383,985 B2 | 2/2013 | Twelves, Jr. et al. |
| 8,488,944 B2 | 7/2013 | Takehi |
| 2007/0001342 A1 | 1/2007 | Oberhofer et al. |
| 2008/0038575 A1 | 2/2008 | Renteria et al. |
| 2009/0200275 A1 | 8/2009 | Twelves, Jr. et al. |
| 2009/0283119 A1 | 11/2009 | Moussa et al. |
| 2011/0135952 A1 | 6/2011 | Morris et al. |
| 2011/0311389 A1 | 12/2011 | Ryan et al. |
| 2012/0018926 A1 | 1/2012 | Mannella et al. |
| 2012/0164322 A1 | 6/2012 | Teulet |
| 2012/0223059 A1 | 9/2012 | Ackelid |
| 2012/0228807 A1 | 9/2012 | Teulet |
| 2013/0065073 A1 | 3/2013 | Fuwa |
| 2013/0101728 A1 | 4/2013 | Keremes et al. |
| 2013/0195673 A1 | 8/2013 | Godfrey et al. |
| 2013/0263977 A1 | 10/2013 | Rickenbacher et al. |
| 2013/0277891 A1 | 10/2013 | Teulet |
| 2013/0307201 A1 | 11/2013 | McEnerney |
| 2015/0290741 A1 | 10/2015 | Abe et al. |

FOREIGN PATENT DOCUMENTS

DE 202013009787 12/2013

OTHER PUBLICATIONS

EP search report for EP15740497.1 dated Jan. 31, 2017.

*Primary Examiner* — Edward M Johnson
(74) *Attorney, Agent, or Firm* — Getz Balich LLC

(57) ABSTRACT

A manufacturing process is provided. During this process, material is solidified together within a chamber to form an object using an additive manufacturing device. At least a portion of the solidified material is conditioned within the chamber using a material conditioning device.

16 Claims, 4 Drawing Sheets

CONDITIONING ONE OR MORE ADDITIVE MANUFACTURED OBJECTS

This application claims priority to PCT Patent Application No. PCT/US15/012469 filed Jan. 22, 2015 which claims priority to U.S. Patent Application No. 61/931,335 filed Jan. 24, 2014, which are hereby incorporated herein by reference in their entireties.

BACKGROUND OF THE INVENTION

1. Technical Field

This disclosure relates to systems and processes for conditioning one or more additive manufactured objects.

2. Background Information

Various additive manufacturing processes are known in the art for forming one or more parts. The term "additive manufacturing" may describe a process where a part or parts are formed by accumulating and/or fusing material together, typically in a layer-on-layer manner. Layers of powder material, for example, may be disposed and thereafter solidified sequentially onto one another to form the part(s). The term "solidify" may describe a process whereby material is sintered and/or otherwise melted thereby causing discrete particles of the sintered and/or melted material to fuse together.

There is a need in the art for improved additive manufacturing system and processes.

SUMMARY OF THE DISCLOSURE

According to an aspect of the invention, a manufacturing process is provided. During this process, material is solidified together within a chamber to form an object using an additive manufacturing device. At least a portion of the solidified material is conditioned within the chamber using a material conditioning device.

According to another aspect of the invention, a process is provided for conditioning an object. During this process, a chemical composition of at least a portion of the object is changed. This changing of the chemical composition is performed within a sealed chamber in which the object was additively formed.

According to still another aspect of the invention, a manufacturing system is provided. This system includes an additive manufacturing device, a material conditioning device and a housing with an internal chamber. The additive manufacturing device is adapted to solidify material together within the chamber to form an object. The material conditioning device is adapted to condition at least a portion of the solidified material within the chamber.

The chemical composition may be changed by at least nitriding at least a portion of the object at a surface of the object. The chemical composition may also or alternatively be changed by at least boriding at least a portion of the object at a surface of the object. The chemical composition may also or alternatively be changed by at least chromizing at least a portion of the object at a surface of the object. The chemical composition may also or alternatively be changed by at least aluminizing at least a portion of the object at a surface of the object.

The conditioning may change a chemical composition of the at least a portion of the solidified material. The conditioning may also or alternatively change a microstructure of the at least a portion of the solidified material.

The conditioning may nitride at least a portion the solidified material at a surface of the object. The conditioning may also or alternatively boride at least a portion the solidified material at a surface of the object. The conditioning may also or alternatively chromize at least a portion the solidified material at a surface of the object. The conditioning may also or alternatively aluminize at least a portion the solidified material at a surface of the object.

The solidifying may fuse the material together using an energy beam generated by the additive manufacturing device.

The object may be or otherwise include a complete additive manufactured part. Alternatively, the object may be or otherwise include a semi-additive manufactured part.

During the process, additional material may be solidified together and with the object within the chamber using the additive manufacturing device to form a second object. At least a portion of the additional solidified material may also be conditioned within the chamber using the material conditioning device.

During the process, at least a portion of the second object may be prepared for the solidification with the additional material.

During the process, a quantity of un-solidified material may be removed from the chamber between the solidification of the material and the conditioning of the solidified material.

The material may be or otherwise include metal powder. The material may also or alternatively be or otherwise include ceramic powder.

The material conditioning device may be adapted to provide gas in the chamber for chemically reacting with the at least a portion of the solidified material.

The material conditioning device may be adapted to nitride at least a portion of the solidified material at a surface of the object. The material conditioning device may also or alternatively be adapted to boride at least a portion of the solidified material at a surface of the object. The material conditioning device may also or alternatively be adapted to chromize at least a portion of the solidified material at a surface of the object. The material conditioning device may also or alternatively be adapted to aluminize at least a portion of the solidified material at a surface of the object.

The additive manufacturing device may be adapted to generate an energy beam for solidifying the material together.

The foregoing features and the operation of the invention will become more apparent in light of the following description and the accompanying drawings.

DETAILED DESCRIPTION OF THE INVENTION

Figure 1:
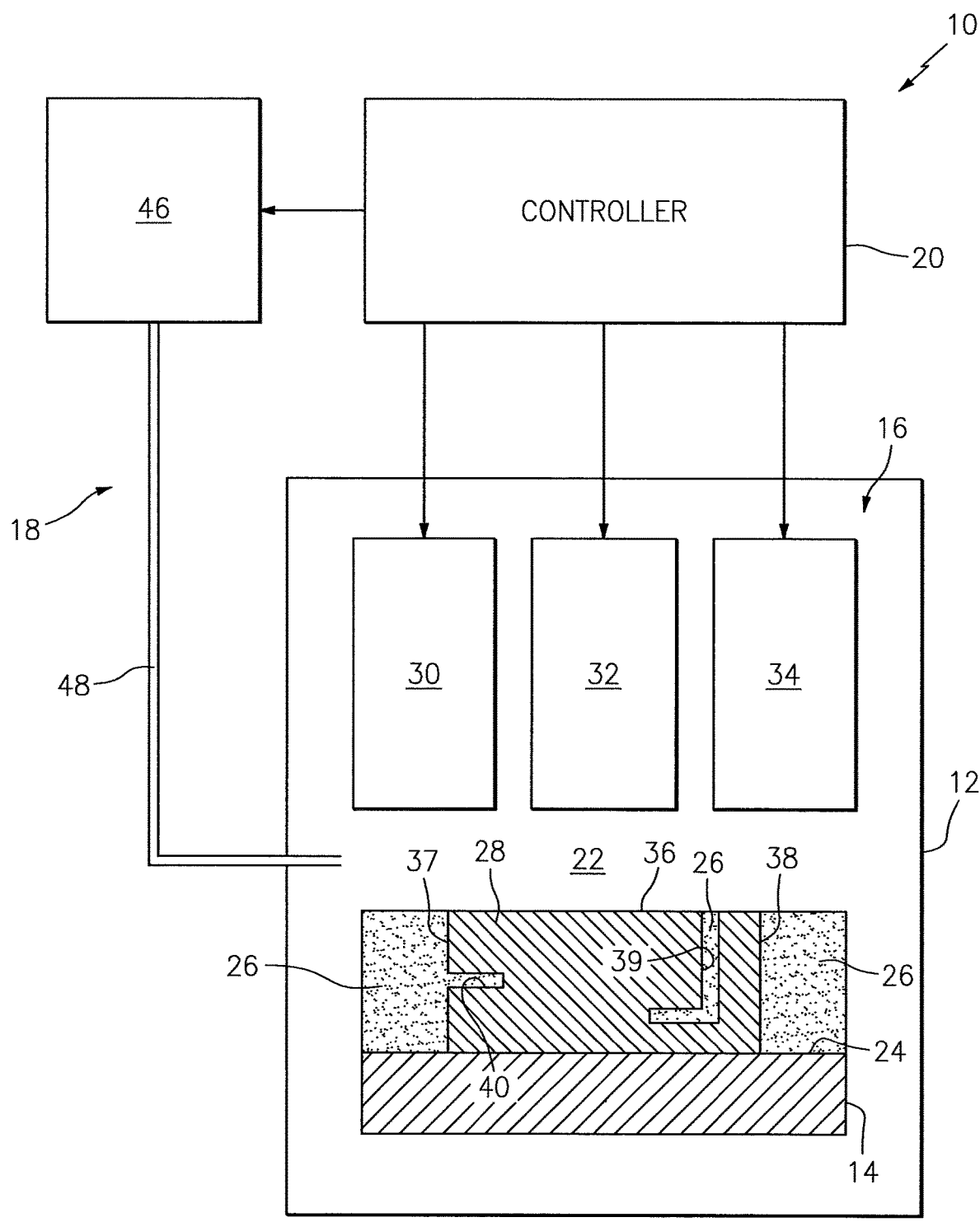
FIG. 1 is a block diagram of a system for manufacturing at least one part.

FIG. 1 is a block diagram of a system 10 for manufacturing at least one part. The manufacturing system 10 includes a housing 12, a base 14, an additive manufacturing device 16 and a material conditioning device 18. The manufacturing system 10 also includes a controller 20 in signal communication (e.g., hardwired and/or wirelessly coupled) with one or more of the system components 14, 16 and 18.

The housing 12 may be configured as a sealed enclosure. The housing 12 includes one or more walls that form an internal chamber 22 such as, for example, a vacuum and/or sealed chamber.

The base 14 is located within the chamber 22. The base 14 includes a support surface 24. This support surface 24 is adapted to support additive manufacturing material 26 (e.g., metal powder) during manufacturing of the part (or parts). The support surface 24 is also or alternatively adapted to support at least one object 28 that is formed, for example, from a solidified portion of the material 26. It is worth noting, depending upon the specific manufacturing step, the object 28 may be a semi-additive manufactured part or a complete additive manufactured part as described below in further detail. Referring again to the base 14 of FIG. 1, the support surface 24 may be substantially horizontal relative to gravity. The support surface 24 may also have a generally planar geometry.

The additive manufacturing device 16 includes a material distribution device 30, a heater 32 and a material solidification device 34. At least a portion of one or more of these additive manufacturing device components 30, 32 and 34 may be located within the chamber 22.

The distribution device 30 is adapted to deposit a quantity of the material 26 onto the support surface 24. This quantity of material 26 may be deposited in a substantially uniform layer over at least a portion or all of the support surface 24.

The distribution device 30 may include a material reservoir (e.g., a hopper), a material outlet (e.g., a conduit) and a material coater (e.g., a blade). The reservoir is adapted to contain a quantity of the material 26. The outlet is adapted to direct the material 26 from the reservoir onto the support surface 24 into a mound (or mounds). The coater is adapted to spread the mound (or mounds) of material 26 across at least a portion of the support surface 24 to provide the layer of material 26. Of course, various other types and configurations of material distribution devices are known in the art, and the additive manufacturing device 16 is not limited to including any particular ones thereof.

The heater 32 is adapted to heat the material 26 and/or the object 28 on the support surface 24. The heater 32 may also be adapted to heat the base 14 and/or the atmosphere (e.g., Noble gas) within the chamber 22.

The heater 32 may include one or more heating devices positioned above the support surface 24, which radiate heat towards the material 26 and/or the object 28. The heater 32 may also or alternatively include one or more heating devices positioned below and/or configured with the base 14. An example of a heating device is an energy beam source (e.g., an electron beam energy source or a laser), which generates and directs an energy beam (e.g., an electron beam or a laser beam) to the material 26 and/or the object 28. Another example of a heating device is a resistance heating element. Of course, various other types and configurations of heaters and heating devices are known in the art, and the additive manufacturing device 16 is not limited to including any particular ones thereof.

The solidification device 34 is adapted to solidify at least a portion or all of the material 26 deposited on or otherwise supported by the support surface 24 to form the object 28. The solidification device 34, for example, may sinter and/or melt at least some of the deposited material 26 such that the sintered and/or melted material fuses together to form the object 28.

The solidification device 34 may include at least one energy beam source such as, for example, a laser or an electron beam energy source. The energy beam source is adapted to generate at least one energy beam (e.g., a laser beam or an electron beam) for sintering, melting or otherwise fusing a portion of the deposited material 26 together. The energy beam source is also adapted to move the energy beam over (e.g., selectively scan) at least a portion of the deposited material 26. Of course, various other types and configurations of solidification devices are known in the art, and the additive manufacturing device 16 is not limited to including any particular ones thereof.

The conditioning device 18 is adapted to condition at least a portion of the solidified material that forms the object 28; e.g., the semi- or complete additive manufactured part. The term "condition" may describe a process in which a chemical composition of and/or a microstructure of an object's material is changed. The conditioning device 18, for example, may be adapted to nitride, boride, chromize, and/or aluminize at least a portion of the solidified material. The conditioning device 18, however, is not limited to performing the foregoing exemplary material conditioning processes. The conditioning device 18, for example, may also or alternatively perform other chemical treating and/or heat treating processes that alter (e.g., increase) one or more of the following properties of at least a portion of the solidified material: wear resistance, oxidation resistance, corrosion resistance, etc.

The conditioning device 18 may be adapted to condition substantially all of the solidified material forming the object 28. The conditioning device 18 may also or alternatively be adapted to condition (e.g., surface condition) one or more portions of the solidified material, which may define and may be proximate one or more surfaces 36-40 of the object 28. At least one of the surfaces (e.g., the exposed surface 36) may be substantially completely exposed to the atmosphere within the chamber 22. One or more of the surfaces (e.g., the semi-exposed surfaces 37-40) may also or alternatively be exposed to the atmosphere within the chamber 22 through, for example, one or more voids within the deposited material 26 and/or passages within the object 28. In this manner, referring to FIG. 2, the conditioning device 18 may form an outer shell 42 of conditioned solidified material at least partially around an inner core 44 of un-conditioned solidified material. It is worth noting the thickness of the outer shell 42 is exaggerated in FIG. 2 for ease of illustration.

Referring again to FIG. 1, the conditioning device 18 may include a gas source 46 and a conduit 48. The gas source 46 may be adapted the produce and/or store a quantity of conditioning gas, examples of which are provided below. The gas source 46 may also be adapted to selectively direct a regulated quantity of the conditioning gas into the chamber 22 through the conduit 48. The conditioning device 18 may also include a heater, which may be similar to the heater 32 described above. Alternatively, the conditioning device 18 may include the heater 32. Of course, various other types and configurations of conditioning devices are known in the art, and the manufacturing system 10 is not limited to including any particular ones thereof.

The controller 20 (e.g., a processing system) is adapted to signal one or more of the system components 14, 16 and 18 to perform at least a portion of the process described below. The controller 20 may be implemented with a combination of hardware and software. The hardware may include memory and one or more single-core and/or multi-core processors. The memory may be a non-transitory computer readable medium, and adapted to store the software (e.g., program instructions) for execution by the processors. The hardware may also include analog and/or digital circuitry other than that described above.

Figure 3:
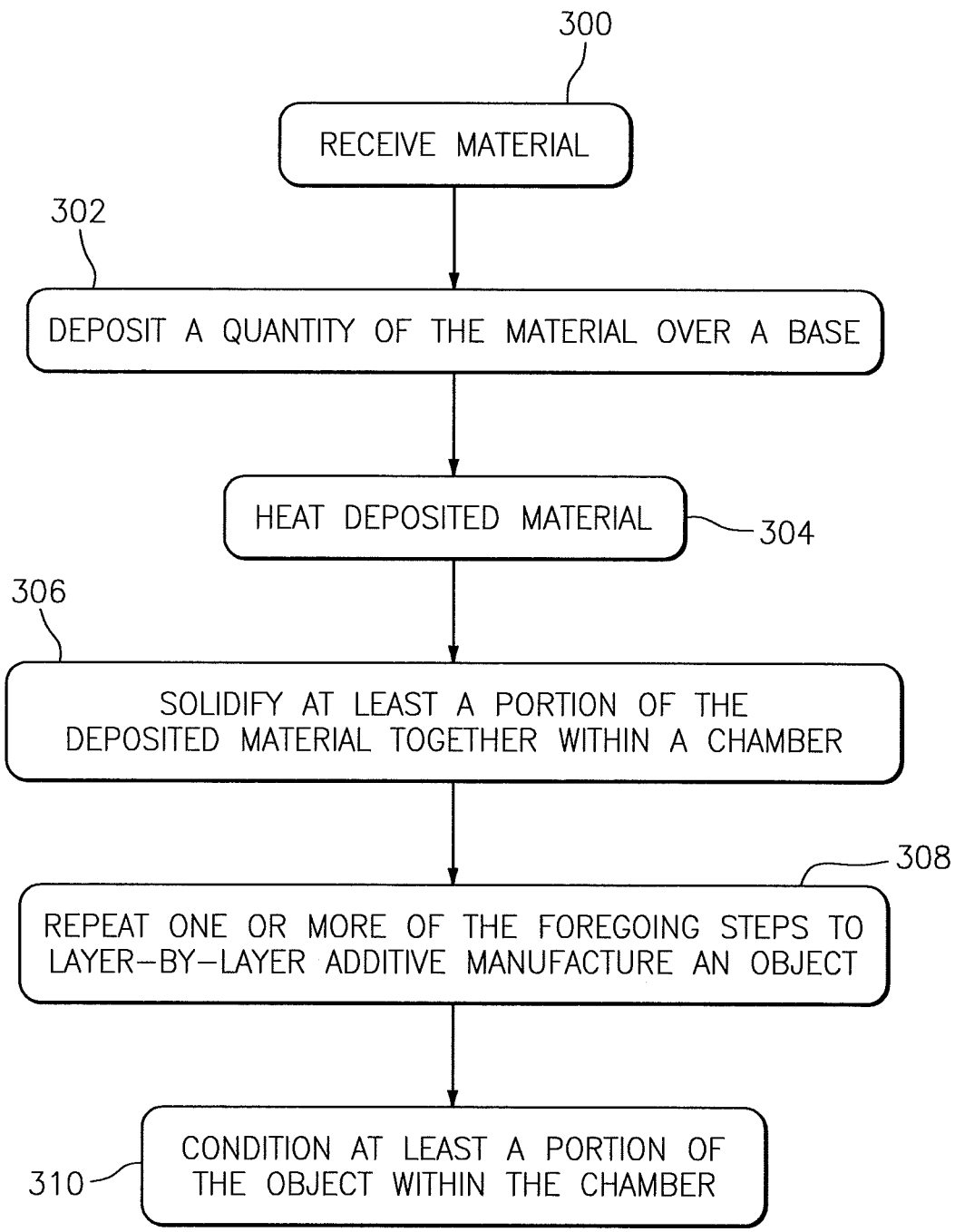
FIG. 3 is a flow diagram of a process for manufacturing at least one part.

FIG. 3 is a flow diagram of a process for manufacturing a part (or parts) using a system such as the manufacturing system 10 of FIG. 1. An example of a part is a rotor blade (or its airfoil) for a turbine engine such as, for example, a turbine blade, a compressor blade or a fan blade. Other examples of a part include a stator blade for a turbine engine, a guide vane for a turbine engine, a gas path wall for a turbine engine as well as various other components included in a turbine engine. The process of FIG. 3 and the manufacturing system 10, however, may also or alternatively additively manufacture parts other than those described above or included in a turbine engine.

In step 300, the additive manufacturing device 16 receives additive manufacturing material 26 (or materials). The material 26, for example, may be deposited into the reservoir of the material distribution device 30.

The additive manufacturing material 26 may be received for manufacturing as powder. The term "powder" may describe a quantity (e.g., an agglomeration) of discrete particles with substantially uniform or varying sizes; e.g., average diameters. The particle size of one or more of the particles may be between about five micrometers (5 μm) and about five-hundred micrometers (500 μm); e.g., between about twenty micrometers (20 μm) and about sixty micrometers (90 μm). The present invention, however, is not limited to any particular particle sizes.

The additive manufacturing material 26 may be composed of or otherwise include one or more metals and/or metal alloys; e.g., metal powder. Examples of metal(s) that may be included in the material 26 include, but are not limited to, aluminum (Al), copper (Cu), titanium (Ti), nickel (Ni), vanadium (V), chromium (Cr), iron (Fe) and/or alloys of one or more of the foregoing metals.

In step 302, a quantity of the material 26 is deposited over the base 14. The controller 20, for example, may signal the material distribution device 30 to deposit a substantially uniform layer of the material 26 (e.g., metal powder) over the support surface 24. This layer of material 26 may be deposited directly on the support surface 24. Alternatively, the layer of material 26 may be deposited on at least one layer of material that was previously deposited and/or solidified on the support surface 24.

In step 304, the deposited material 26 and/or previously solidified material are heated to an elevated temperature. The controller 20, for example, may signal the heater 32 to heat the deposited material 26 and/or the previously solidified material to the elevated temperature using the heating device(s) positioned above, below and/or configured with the base 14.

The elevated temperate may be relatively close to (e.g., between about 500° C. and 50° C. below) a melting temperature of the material 26. In this manner, energy required by the energy beam is reduced and precision of material melting may be increased during the material solidification step described below. In general, however, the elevated temperature should be sufficiently below the melting temperature of the material 26 to prevent or significantly reduce likelihood of the particles of the deposited material 26 from uncontrollably fusing (e.g., sintering) together. In other embodiments, of course, the elevated temperature may be anywhere between room temperature (e.g., about 20° C.) and the melting temperature of the material 26.

In step 306, at least a portion of the deposited material 26 (e.g., layer of metal powder) is solidified together. The controller 20, for example, may signal the solidification device 34 to selectively scan its energy beam over at least a portion of the deposited material 26 to form the object 28; e.g., at least a portion of the part. The energy beam may sinter and/or melt the respective material. The sintered and/or melted material may fuse together and thereafter solidify providing a solid mass of object material that forms the object 28.

In step 308, one or more of the foregoing steps (e.g., the steps 302, 304 and 306) may be repeated for one or more iterations in order to additively manufacture the object 28 layer-by-layer. Upon the completion of this step, the object 28 may be a complete additive manufactured part. The term "complete additive manufactured part" may describe an object for which material buildup is substantially complete and/or that has a general geometry of a finished part.

In step 310, at least a portion of the solidified material forming the object 28 (e.g., the complete additive manufactured part) is conditioned. The controller 20, for example, may signal the heater 32 (or the heater of the conditioning device 18) to heat the object 28 as well as the unsolidified deposited material 26 to an elevated temperature, which may be equal to or different (e.g., higher or lower) than the elevated temperature of the step 304. Alternatively, the controller 20 may signal the heater 32 (or the heater of the conditioning device 18) to maintain the elevated temperature of the step 304.

Figure 2:
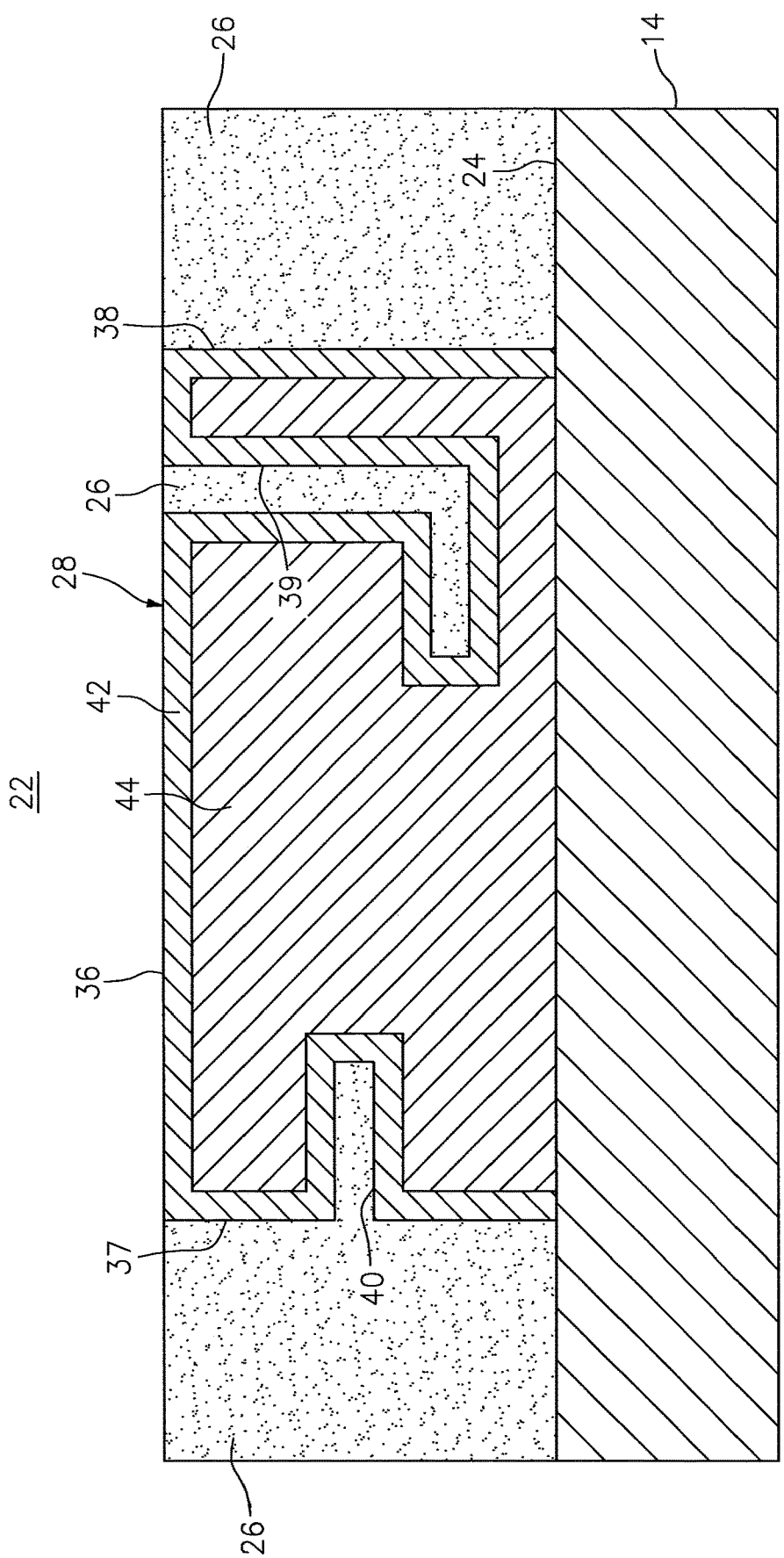
FIG. 2 is a sectional illustration of a conditioned object and unsolidified material on a base.

The controller 20 may also or alternatively signal the conditioning device 18 to direct the conditioning gas from its gas source 46 through the conduit 48 and into the chamber 22 and towards the heated object 28. The conditioning gas may thereafter chemically react with and/or diffuse into at least a portion of the solidified material at (e.g., on, adjacent and/or proximate) the exposed surface 36. The conditioning gas may also flow through voids within the unsolidified material 26 and/or passages within the object 28, and react and/or diffuse into at least portions of the solidified material at the semi-exposed surfaces 37-40. In this manner, the conditioning gas may be used to form the outer shell 42 of conditioned solidified material at least partially around the inner core 44 of un-conditioned solidified material as illustrated in FIG. 2.

Table I lists various examples of conditioning gases that may be used during the conditioning step 310. The method of FIG. 3 and manufacturing system 10, however, are not limited to using the exemplary types and/or classes of conditioning gases listed in Table I.

TABLE I

| Representative Gas | Type of Conditioning |
| --- | --- |
| Ammonia gas | Nitriding |
| Boron halide gas | Boriding |
| Boron hydride gas | Boriding |
| Chromous iodide gas | Chromizing |
| Aluminum with aluminum chloride gas | Aluminizing |

The conditioning step 310 is described above as being performed on a complete additive manufactured part. However, in other embodiments, the step 310 may be performed one or more times during the layer-by-layer material buildup; e.g., during one or more of iterations of the step 308. For example, the step 310 may be performed after each or after a select number of material buildups. In such embodiments, the process may also include a step of preparing a conditioned layer (e.g., the object 28) for deposition of a subsequent layer(s) of the material 26. The controller 20, for example, may signal the solidification device 34 to direct the energy beam against a surface of the object 28 (e.g., the exposed surface 36) on which additional material is to be fused and solidified. The electron beam may heat the conditioned solidified material to a sufficient temperature such that the previously diffused conditioning gas migrates out of the solidified material at the respective surface (e.g., the exposed surface 36). Of course, various other surface bonding preparation processes are known in the art, and the present process is not limited to any particular ones thereof.

Figure 4:
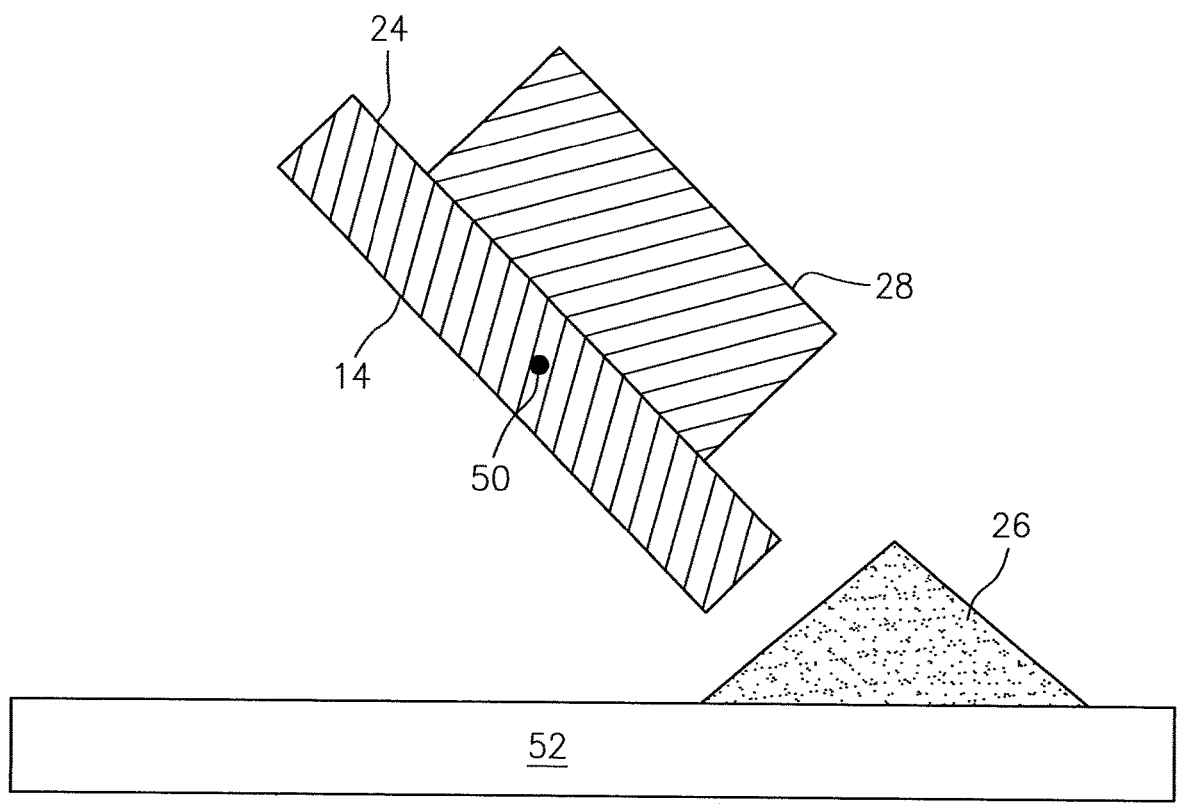
FIGS. 4 and 5 are sectional illustrations of an unconditioned object on a base and unsolidified material on a material collection device.
Figure 5:
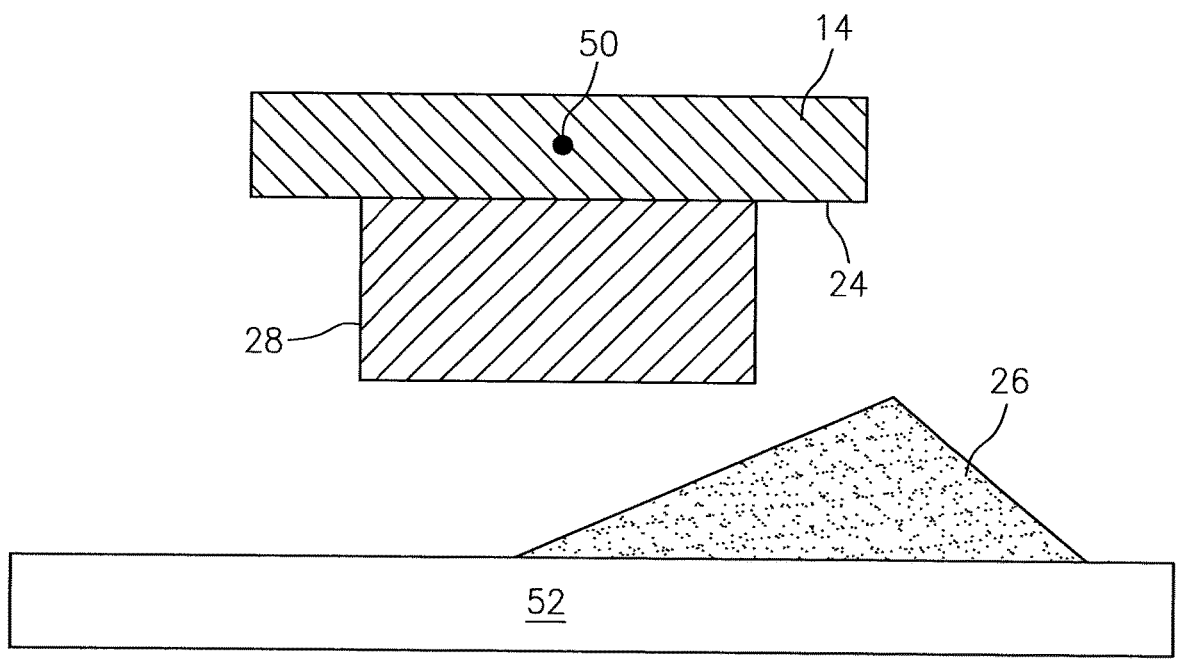

In some embodiments, some or substantially all of the unsolidified material 26 may be removed from the chamber 22 before the conditioning step 310. For example, referring to FIGS. 4 and 5, the base 14 may be adapted to pivot about an axis 50 such that the support surface 24 rotates relative to the gravitational horizon; e.g., between about forty-five degrees (45°) and about one hundred and eighty degrees (180°). The unsolidified material 26 may slide and/or fall off the rotated support surface 24. The unsolidified material 26 may subsequently be removed from the chamber 22 by a material collection device 52 such as, for example, a vacuum. In this manner, the unsolidified and unconditioned material 26 may be used for subsequent additive manufacturing. It is worth noting, however, the object 28 may remain on the support surface 24 since the solidification of the base layer of material typically bonds (e.g., welds) the object 28 to the base 14.

The process of FIG. 3 may include one or more additional steps other than those described above. For example, in some embodiments, the object 28 may undergo additional manufacturing processes during and/or after the material buildup step. Examples of such additional manufacturing processes may include, but are not limited to, machining, surface finishing, coating, etc. In addition, one or more of the steps of the process of FIG. 3 may be omitted. For example, the process of FIG. 3 may be performed without the heating step 304.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A manufacturing process, comprising:
    solidifying material together within a chamber to form an object using an additive manufacturing device; and
    conditioning at least a portion of the solidified material within the chamber using a material conditioning device.

2. The process of claim 1, wherein the conditioning comprises changing a chemical composition of the at least a portion of the solidified material.

3. The process of claim 1, wherein the conditioning comprises changing a microstructure of the at least a portion of the solidified material.

4. The process of claim 1, wherein the conditioning comprises nitriding at least a portion the solidified material at a surface of the object.

5. The process of claim 1, wherein the conditioning comprises boriding at least a portion the solidified material at a surface of the object.

6. The process of claim 1, wherein the conditioning comprises chromizing at least a portion the solidified material at a surface of the object.

7. The process of claim 1, wherein the conditioning comprises aluminizing at least a portion the solidified material at a surface of the object.

8. The process of claim 1, wherein the solidifying comprises fusing the material together using an energy beam generated by the additive manufacturing device.

9. The process of claim 1, wherein the object comprises a complete additive manufactured part.

10. The process of claim 1, further comprising:
    solidifying additional material together and with the object within the chamber using the additive manufacturing device to form a second object; and
    conditioning at least a portion of the additional solidified material within the chamber using the material conditioning device.

11. The process of claim 10, further comprising preparing at least a portion of the second object for the solidification with the additional material.

12. The process of claim 1, further comprising removing a quantity of un-solidified material from the chamber between the solidification of the material and the conditioning of the solidified material.

13. The process of claim 1, wherein the material comprises metal powder.

14. The process of claim 1, wherein the material comprises ceramic powder.

15. A process for conditioning an object, the process comprising:
    changing a chemical composition of at least a portion of the object;
    wherein the changing of the chemical composition is performed within a sealed chamber in which the object was additively formed.

16. The process of claim 15, wherein the changing of the chemical composition comprises one or more of nitriding, boriding, chromizing and aluminizing at least a portion of the object at a surface of the object.

* * * * *